Patented June 15, 1926.

1,588,499

UNITED STATES PATENT OFFICE

HENRY M. SCHLEICHER, OF BOSTON, MASSACHUSETTS, ASSIGNOR TO AMERICAN METAL COMPANY LTD., OF NEW YORK, N. Y., A CORPORATION OF NEW YORK.

PRODUCTION OF CALCIUM ARSENATE.

No Drawing.  Application filed November 11, 1924. Serial No. 749,336.

This invention relates to the production of calcium arsenate, and particularly of a product which is suitable for use as an insecticide and for other purposes for which calcium arsenate should be substantially free from sodium compounds.

The production of calcium arsenate by a reaction between a solution of sodium arsenate and lime (calcium oxide) in solution or in suspension has been suggested heretofore. The production of calcium arsenate in this manner has failed heretofore because the reaction results in a product containing sodium compounds. Calcium sodium arsenate tends to decompose in water, some of the arsenate going into solution probably as sodium arsenate. The specifications for insecticide call for low solubility of arsenic and even the normal calcium arsenate has too high solubility. To reduce the solubility of arsenic it is necessary to have at least four molecules of CaO to each molecule of $As_2O_5$.

I have discovered that under certain conditions and with the observations of suitable precautions calcium arsenate can be prepared directly from sodium arsenate by the addition of lime thereto. The product is substantially free from sodium compounds and fulfills the requirements for an insecticide. It is also suitable for other uses.

It is the object, therefore, of my invention to provide a process of producing calcium arsenate in an economical and otherwise satisfactory manner.

In carrying out the invention the solution of sodium arsenate is prepared. The solution may be derived from the leaching of materials containing sodium arsenate, recovered, for example, in the refining of lead bullion. Other sources of sodium arsenate are available and the source is not important so long as the sodium arsenate solution is not contaminated by elements which will affect the reaction with lime. The lime used should be substantially pure calcium oxide in an anhydrous and unslaked condition. It is desirable that the lime be fresh because when it is air slaked the reaction is retarded.

The sodium arsenate solution is heated preferably to a temperature of about 90° C. and is subject to vigorous agitation at the same time that the dry lime is gradually added. The temperature tends to rise and the addition of lime is controlled to avoid an increase of temperature to the boiling point of the solution. The reaction proceeds rapidly under these conditions. The caustic liquor can then be separated by filtering or otherwise and the precipitate can be prepared for shipment in the usual manner.

The concentration of the solution employed is relatively important, particularly from the standpoint of avoiding the presence of unnecessary amounts of water which must be removed from the caustic liquor by evaporation before the caustic can be reused. I prefer to employ solutions of sodium arsenate equivalent to 10 to 12% of sodium hydroxide by weight. Solutions containing 6% of arsenate, as such, by weight give satisfactory results, the caustic liquor resulting from the reaction containing about 11% of caustic soda.

The calcium arsenate should contain approximately four molecules of lime to each molecule of arsenic pentoxide when the material is to be used for insecticide, the compound having the formula

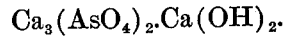
$$Ca_3(AsO_4)_2 \cdot Ca(OH)_2.$$

A lower ratio of lime is permissible for other purposes. The normal arsenate contains three molecules of lime and the lime should be added in excess to produce a material which meets the requirements for an insecticide.

A particular advantage of the invention is the recovery of substantially all of the sodium in the form of sodium hydroxide. This is especially important where the process is employed to recover sodium hydroxide for reuse in the production of sodium arsenate as, for example, by the treatment of lead bullion with the sodium hydroxide. Furthermore, the process permits the recovery of the sodium hydroxide in a relatively concentrated form so that the cost of removing the water is reduced to a minimum.

It will be understood that while certain temperatures and concentrations are mentioned herein as examples of the best mode of procedure, these conditions are subject to variations and the details of the operation can be varied likewise without departing from the invention or sacrificing the advantages thereof. Potassium arsenate can be used similarly in the reaction.

I claim:—

1. The process of preparing calcium arsenate, which comprises adding dry unslaked lime to a heated solution of an alkali metal arsenate.

2. The process of preparing calcium arsenate, which comprises heating a solution of an alkali metal arsenate, stirring the solution and gradually adding dry unslaked lime.

3. The process of preparing calcium arsenate, which comprises stirring a heated solution of an alkali metal arsenate containing approximately 6% of arsenate by weight and adding dry unslaked lime thereto.

4. The process of preparing calcium arsenate, which comprises heating a solution of an alkali metal arsenate, stirring the solution and gradually adding an excess of dry unslaked lime.

5. The process of preparing calcium arsenate which comprises adding dry unslaked lime to a solution of alkali metal arsenate heated to about 90° C.

6. The process of preparing calcium arsenate which comprises, adding dry unslaked lime to a heated solution of alkali metal arsenate, and controlling the procedure of adding the lime to avoid an increase in temperature to the boiling point of the solution.

7. The process of preparing calcium arsenate which comprises, heating a solution of an alkali metal arsenate, stirring the solution and adding dry unslaked lime, and controlling the procedure of adding the lime to avoid an increase in temperature to the boiling point of the solution.

In testimony whereof I affix my signature.

HENRY M. SCHLEICHER.